(12) United States Patent
Daris

(10) Patent No.: US 7,243,407 B2
(45) Date of Patent: Jul. 17, 2007

(54) MODULAR TURRET-STYLE BASE PLATE SYSTEM FOR CNC MACHINES

(75) Inventor: Paul E. Daris, West Springfield, MA (US)

(73) Assignee: Marox Corporation, Holyoke, MA (US)

( * ) Notice: Subject to any disclaimer, the term of this patent is extended or adjusted under 35 U.S.C. 154(b) by 0 days.

(21) Appl. No.: 11/149,658

(22) Filed: Jun. 10, 2005

(65) Prior Publication Data

US 2006/0277734 A1    Dec. 14, 2006

(51) Int. Cl.
*B23P 23/00* (2006.01)
*B23Q 3/06* (2006.01)
*B23B 29/00* (2006.01)

(52) U.S. Cl. ............... 29/38 C; 409/221; 29/33 P; 29/36; 82/120; 82/121

(58) Field of Classification Search ............... 29/38 C, 29/38 R, 36, 33 P, 563, 56.5; 409/163, 164, 409/189, 197, 198, 205, 219, 220, 221, 224, 409/225, 263, 276, 277, 278, 903; 74/813 R; 82/120, 121
See application file for complete search history.

(56) References Cited

U.S. PATENT DOCUMENTS

| | | | |
|---|---|---|---|
| 3,385,138 A | 5/1968 | Wusteney et al. |
| 4,643,411 A | 2/1987 | Izumi |
| 4,662,043 A | 5/1987 | Stone et al. |
| 4,794,686 A | 1/1989 | Moore |
| 4,921,378 A | 5/1990 | Kytola |
| 4,942,650 A | 7/1990 | Howarth |
| 5,039,074 A | 8/1991 | Klancnik et al. |
| 5,212,857 A | 5/1993 | McMurtry |
| 5,239,901 A | 8/1993 | Lin |
| 5,535,995 A | 7/1996 | Swann et al. |
| 5,867,280 A | 2/1999 | Seitz et al. |
| 6,003,415 A | 12/1999 | Turner et al. |
| 6,076,441 A | 6/2000 | Billington |
| 6,725,750 B1 | 4/2004 | Feltch et al. |
| 6,745,454 B1 | 6/2004 | Grimshaw et al. |

FOREIGN PATENT DOCUMENTS

WO     WO 00/56488 A1  *  9/2000

* cited by examiner

*Primary Examiner*—Dana Ross
(74) *Attorney, Agent, or Firm*—McCormick, Paulding & Huber LLP

(57) ABSTRACT

A modular base plate system is for use with a CNC machine for holding workpieces during manufacturing. The system includes a "turret-style" base plate having a plurality of stations positioned around the side of the base plate. Each station comprises a U-shaped pocket machined or otherwise formed in the base plate sidewall. The base plate system further includes a number of fixture blocks that fit in the pockets, with each block having a holder for holding workpieces. In operation, workpieces are attached to the fixture blocks, the fixture blocks are inserted into the pockets, and the fixture blocks are removably secured to the base plate. Then, the base plate is affixed to a CNC machine in a standard manner, e.g., using a pallet or rotary table or the like. In this manner, machining operations can be performed on a number of parts in sequence before any part changeover is required.

10 Claims, 4 Drawing Sheets

MODULAR TURRET-STYLE BASE PLATE SYSTEM FOR CNC MACHINES

FIELD OF THE INVENTION

The present invention relates to CNC machines and similar tools and, more particularly, to work holders for holding parts for machining or manufacturing using a CNC machine or similar tool.

BACKGROUND OF THE INVENTION

For manufacturing a part using a multi-axis CNC machine or the like, the part blank (e.g., a metal or plastic blank) must be held securely to eliminate undesired movement of the part during a machining operation. Typically, this is done by affixing a single part holder (e.g., clamp, vise, or other fixture) to a standard CNC machine pallet 20 or chuck, an example of which is shown in FIGS. 1 and 2. The pallet 20 typically has a flat top surface 22, to which the part holder is attached, and a pull stud 24 and/or mounting holes that are grasped by the CNC machine. In manufacturing a part, the entire pallet 20, along with the part holder and part blank, are moved and manipulated by the CNC machine. The CNC machine is programmed so that the part is properly positioned with respect to the pallet, work holder, and CNC machine, i.e., the CNC machine knows the part's exact position.

Once a part has been manufactured, the CNC machine must be halted, the finished part removed from the part holder, and a new part blank inserted. In some situations, the part holder must be disconnected from the pallet 20 for part changeover. This may lead to slow throughput when manufacturing multiple instances of the same part. Additionally, pallets are not well suited for holding multiple parts in a manner that facilitates multiple successive machining steps.

SUMMARY OF THE INVENTION

According to an embodiment of the present invention, a modular base plate system is for use with a CNC machine or the like for holding workpieces or other parts during a manufacturing or machining process. The base plate system includes a generally cylindrical, "turret-style" base plate having flat or angled top and bottom surfaces and an interconnecting, peripheral sidewall. A plurality of stations are positioned around the sidewall, with each station comprising a U-shaped pocket machined or otherwise formed in the base plate sidewall. The base plate system further includes a number of fixture blocks that are shaped to fit into the pockets at close tolerance. Each fixture block includes a workpiece holder for holding a workpiece or other part for manufacturing. Although the fixture blocks are configured to fit in the pockets, a number of different types or styles of fixture blocks can be used depending on the part(s) to be held, i.e., the fixture blocks can be provided with different workpiece holders.

In operation, the fixture blocks are inserted into the pockets (i.e., each pocket accommodates one fixture block) and removably secured to the base plate using standard fasteners. Then, workpieces are attached to the fixture blocks. In this manner, the base plate carries a number of parts, each of which is located at a set or known position with respect to the base plate. Subsequently, the base plate is affixed to a standard CNC machine pallet or the like, and the pallet is attached to the CNC machine. In this manner, machining operations can be performed on a number of parts in sequence before any part changeover is required. Additionally, one base plate system may be changed over for another very quickly.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
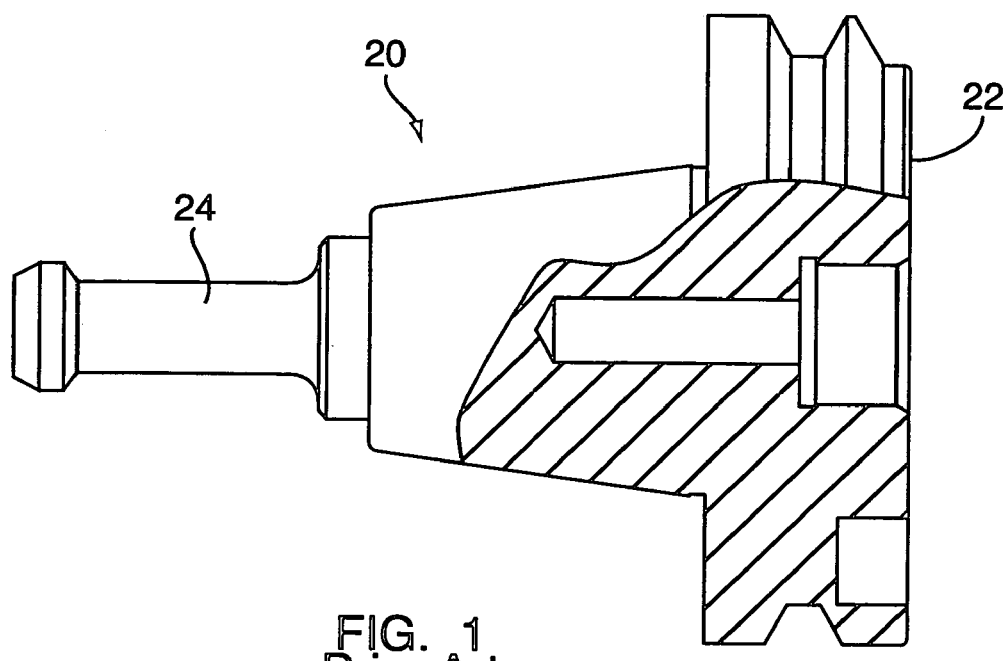
FIG. 1 is a side elevation view of a prior-art pallet.
Figure 2:
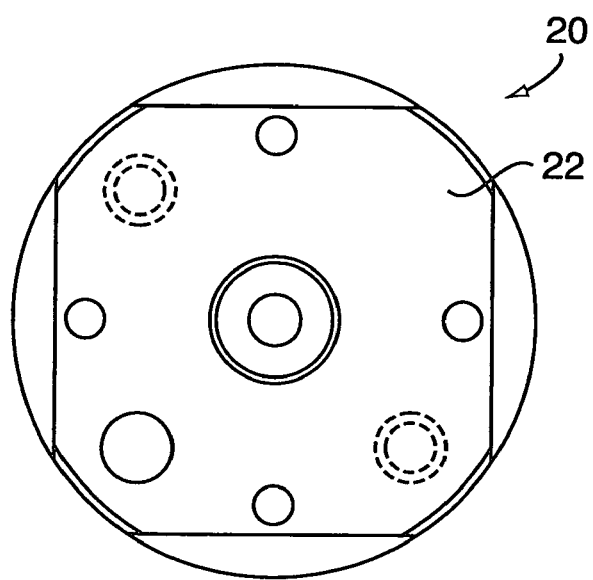
FIG. 2 is a top plan view of the prior-art pallet.

With reference to FIGS. 3–10, an embodiment of the present invention relates to a modular base plate system 30 for use in holding workpieces or other parts during a CNC manufacturing process, e.g., in a multi-axis CNC machine, a multi-axis turn/mill machine, or a similar machining or manufacturing tool or system. With reference to FIGS. 3–9, the base plate system 30 includes a "turret-style" base plate 32, which is a squat, generally cylindrical, 8-sided body. The base plate 32 is configured for removable attachment to a standard pallet 20 (see FIG. 9), and/or to various other machine tool pallets, tables, chucks, or similar devices; the pallet 20 shown in FIGS. 1 and 2 is merely exemplary. A bottom surface 34 of the base plate 32 is flat (see FIG. 7), and has various holes or apertures 36 for attachment to the pallet 20 or similar device, some of which extend entirely through the base plate 32. A top surface 40 of the base plate 32 (see FIG. 6) is also flat, and includes a plurality of attachment holes 42, which enable other fixtures to be attached to the top of the base plate 32, if desired. For example, if it is desired to use a machine tool to process a part using a standard workpiece holder, instead of having to remove the base plate 32 from the machine tool for attaching the standard workpiece holder, the standard workpiece holder can be simply attached to the top of the base plate 32, which is left in the machine tool.

Figure 5:
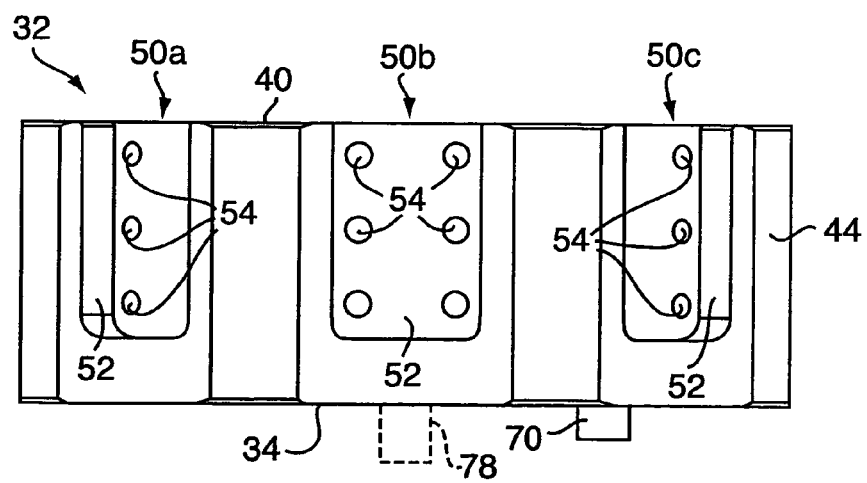
FIG. 5 is a side elevation view of a base plate portion of the system.
Figure 6:
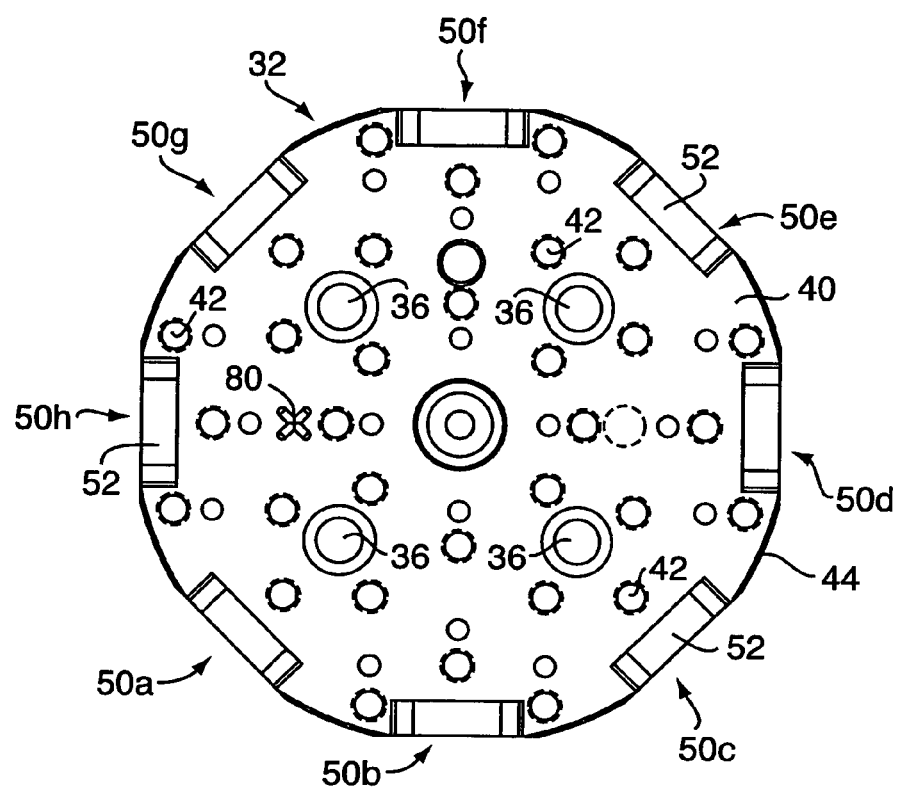
FIG. 6 is a top plan view of the base plate shown in FIG. 5.
Figure 7:
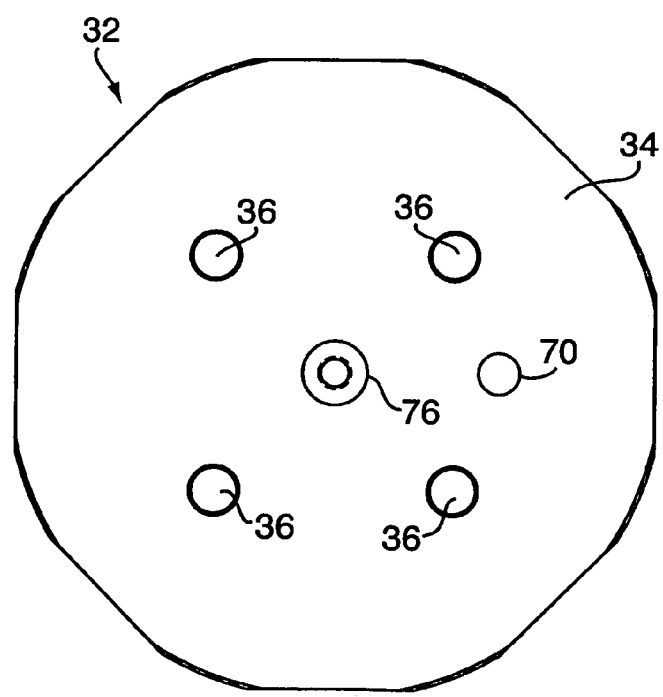
FIG. 7 is a bottom plan view of the base plate shown in FIG. 5.
Figure 8A:
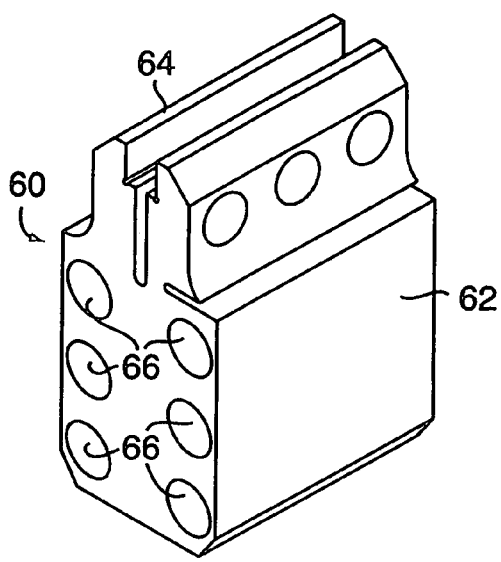
FIG. 8A is a perspective view of a fixture block portion of the base plate system.
Figure 8B:
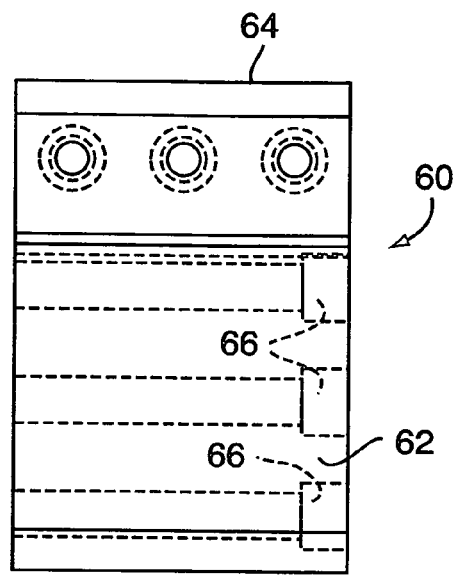
FIG. 8B is a side elevation view of the fixture block shown in FIG. 8A.

A peripheral side wall 44 connects the top surface 40 and bottom surface 34. The side wall 44 is a generally cylindrical surface, and may be circular, semi-polygonal (i.e., flat side surfaces connected by rounded portions), or polygonal. The side wall 44 includes a number of "stations" 50a–50h machined or otherwise formed therein. Eight stations are shown in the figures; however, a base plate could be provided with more or fewer stations. If the side wall 44 was circular, the stations would be positioned around the circumference of the circle. As shown in FIGS. 5 and 6, each station 50a–50h comprises a generally U-shaped pocket 52 machined into the side of the base plate 32. Each pocket has a bottom wall, two sidewalls, and a rear wall, but the top and front are open. Each pocket also includes a plurality of threaded fastener bores 54 extending back into the base plate from the pocket rear wall. As indicated in FIG. 4, the pocket rear walls will typically be oriented tangentially to the base plate, i.e., perpendicular to a radius of the base plate.

Figure 3:
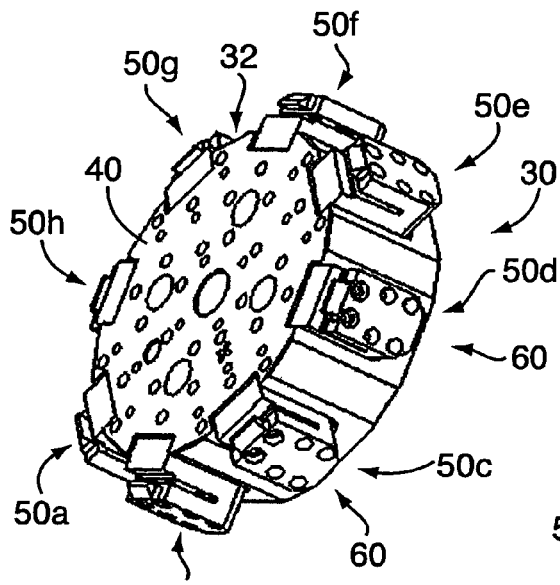
FIG. 3 is a perspective view of a modular base plate system according to an embodiment of the present invention.
Figure 4:
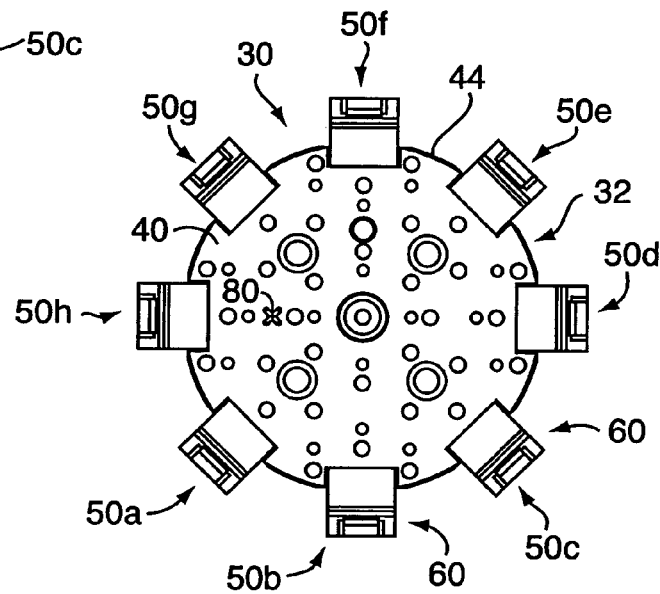
FIG. 4 is a top plan view of the base plate system.

The base plate system 30 further includes a plurality of fixture blocks 60, as shown in FIGS. 3, 4, and 8A–8B. Each fixture block 60 includes a base 62, which is a generally rectangular solid, and a workpiece holder 64 positioned on top of the base 62. Additionally, a plurality of fastener apertures 66 extend through the fixture block 60. As indicated in FIGS. 3 and 4, the fixture block bases 62 are dimensioned very closely to fit into the U-shaped pockets 52 of the base plate 32. Once inserted into the pockets 52, the block apertures 66 align with the pocket fastener bores 54, allowing the blocks 60 to be securely attached to the base plate 32 using machine bolts or other fasteners.

The workpiece holders 64 may be attached to the bases 62, but more typically will be machined or otherwise formed integrally therewith. Additionally, the fixture blocks are not limited to any particular type of workpiece holder. Rather, the workpiece holders 64 may be of a standard type or design, or they may be customized to the particular part being manufactured. For example, the fixture blocks 60 may be provided in a manner for customizing, e.g., a fixture block with a finished base 62 and a "blank" workpiece holder, typically in the form of an integral metal extension or protuberance, for the end user to machine into the desired shape or configuration for holding the part blank of interest. As should be appreciated, the workpiece holders 64 are used to hold/clamp workpieces or other parts (polymer, metal, composite, wood, etc.) for machining or other manufacturing operations.

Figure 9:
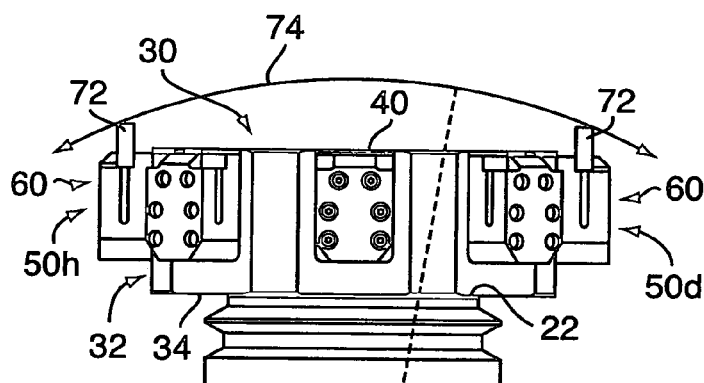
FIG. 9 shows the base plate system attached to a pallet.
Figure 9:
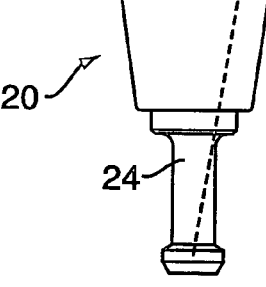

Once inserted into the pockets 52, the tops of the fixture block bases 62 will typically lie coplanar with, or above, the top surface 40 of the base plate 32. As such, the workpiece holders 64 will typically also lie at or above the base plate top surface 40. In effect, the fixture blocks 60 act as removable radial extensions of the base plate 32 for holding workpieces close to the base plate top surface 40. This may be advantageous for facilitating certain machining operations, since, as shown in FIG. 9, the parts 72 lie generally along an exposed radius of movement 74 (i.e., along a curved or spherical surface) of the base plate and pallet in combination. Additionally, the parts 72 will be the same distance from the base plate/pallet axis at all times, and will lie in the centerline of rotation. Thus, if the base plate 32 is rotated about its axis by an angle equal to the angle between stations 50, the workpieces will remain oriented in a consistent manner, which facilitates indexing. For example, with reference to FIG. 4, if the base plate 32 is rotated 45 degrees clockwise, station 50g will take the place of 50f, but the workpiece held by station 50g will be oriented in the same manner as the workpiece held by station 50f prior to the rotation. This allows the CNC machine to make successive operations on each part simply by rotating the base plate 32 radially to the next part.

For attaching the base plate 32 to a pallet 20 or the like, the base plate bottom surface 34 is placed against the pallet top surface 22, and machine bolts or other fasteners are passed down through the holes/apertures 36 from the side of the top surface 40. The base plate 32 also has a precision bored hole 76 (see FIG. 7) coaxial with the base plate's central axis. The hole 76 accommodates various sizes of locating plugs 78 (see FIG. 5) for use with various CNC machines and/or pallets 20, i.e., the locating plug helps with aligning the base plate and pallet coaxially. Then, depending on the number and type of parts to be manufactured, one or more fixture blocks 60 are attached to respective stations 50a–50h. If the parts are large, it may be the case that only a few of the stations can be used. However, if the parts are small enough to not encroach on neighboring stations, fixture blocks 60 may be attached to all the stations 50a–50h. Thus, as shown in FIGS. 3 and 4, the base plate 32 may carry up to eight fixture blocks 60, each holding a workpiece (part blank) for manufacturing a part. The workpieces may be attached to the fixture blocks prior to the fixture blocks being attached to the base plate, or they may be affixed to the fixture blocks afterwards.

In operation, for manufacturing parts, the pallet 20 (with affixed base plate 32) is connected to a CNC machine in a standard manner. Alternately, the pallet 20 with attached base plate 32 can be left attached to the CNC machine, with the fixture blocks 60 being detached from the base plate 32 for parts changeover. Then, the CNC machine is operated in a known, standard manner. Because the base plate 32 can hold multiple parts, instead of only one part as is typically the case in existing machines, the CNC machine can move from one part to the next, in a successive manner, without an operator having to switch over parts or fixtures. In particular, whereas previously an operator would have had to change over a part after each individual machining operation, with the base plate system 30 a changeover is only required after the machining operation is complete for all carried parts or part blanks. Moreover, when multiple base plate systems and pallets are utilized, the changeover process is very quick—all that is required is removing one unit from the CNC machine and inserting another, which can oftentimes be done automatically by the machine itself, e.g., a robot arm or carousel. Actually removing the finished parts from the workpiece holders 64 can be done while the CNC machine is working on another unit.

As should be appreciated, multiple instances of the same type of part can be attached to the base plate 32 in different orientations, as might be useful for increasing throughput in certain types of machining operations. Additionally, different types of parts or part blanks may be attached to the base plate 32 at the same time, simply by attaching the appropriate types of fixture blocks to the base plate—again, although the fixture block bases 62 are uniformly dimensioned to fit into the stations 50a–50h, the workpiece holders 64 can be of any type or mix as desired.

Figure 10:
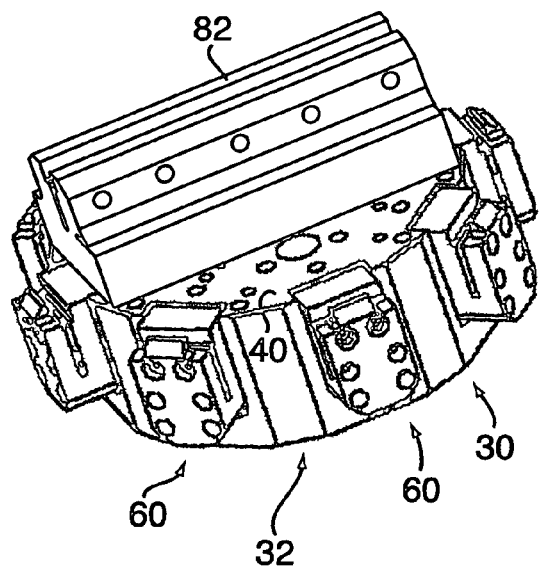
FIG. 10 is a top plan view of a clamping fixture attached to the base plate.

As noted above, because of the attachment holes 42, standard fixtures can still be attached to the top of the base plate, meaning that the base plate can be permanently left in place in a machine tool and/or permanently attached to a pallet 20, if desired. Typically, various types of attachment holes 42 will be provided for attaching different types of fixtures and vises, e.g., a clamping fixture 82 as shown in FIG. 10, and the holes may be spaced according to a standard spacing. (In FIG. 10 the clamping fixture 82 is shown with the fixture blocks 60 in place; in operation, this would normally not be the case). All the fastener/attachment holes herein may be "thread formed" for high strength.

Optionally, a thin, flexible gasket (not shown), e.g., polymer/plastic, may be interposed between the base plate 32 and pallet 20 for buffering the connection there between and for keeping coolant or debris out of any unoccupied holes/apertures. For indexing the base plate 32 to the pallet, the base plate may have one or more indexing features that register with corresponding features on the pallet. For example, the base plate may be provided with a radial timing pin 70 (see FIGS. 5 and 7) projecting out past the base plate bottom surface 34 for aligning the base plate and pallet in terms of a radial angle. The top surface 40 of the base plate 32 may have a radial orientation reference mark 80 for operator use in aligning the base plate.

The base plate 32 and fixture blocks 60 will typically be made of a sturdy material such as metal, e.g., steel or aluminum. Also, as noted above, the base plate 32 is generally squat, by which it is meant that in most situations the base plate 32 only has to be thick enough for structural stability, for secure attachment of the fixture blocks, and for accommodating the attachment holes 42. Thus, the base plate 32 will typically be at least twice as wide as it is high.

Since machining operations oftentimes involve debris and the use of liquid coolants, the base plate system 30 may be provided with pocket blocks for plugging or covering the stations 50 when not in use. The pocket blocks would be made of a polymer (e.g., nylon) or metal, and would be dimensioned to occupy the pockets 52. The pocket blocks would be temporarily attached to the base plate 32 in a manner similar to as described above with respect to the fixture blocks 60. The base plate system 30 may also be provided with a polymer cover plate for covering the top surface 40 of the base plate.

Although the pockets 52 are shown as being generally U-shaped and with open tops, pockets with other shapes or configurations could be provided instead without departing from the spirit and scope of the invention.

Although the top and bottom surfaces of the base plate have been illustrated as being flat, they could also be angled or otherwise configured in a non-flat manner for use in particular applications, without departing from the spirit and scope of the present invention.

The present invention may be characterized as a system 30 for holding a plurality of workpieces, where the system includes a plurality of holder means 60 (the fixture blocks) each for holding a workpiece, as well as base means 32 (the base plate) for supporting the plurality holder means 60.

Since certain changes may be made in the above-described modular turret-style base plate system for CNC machines, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A system for holding work pieces, said system comprising:
    a generally cylindrical base plate having a generally flat and circular top surface, a generally flat and circular bottom surface, a side wall interconnecting the top and bottom surfaces, and a plurality of pockets formed in the side wall, wherein the top and bottom surfaces are generally parallel to one another and are generally perpendicular to a longitudinal axis of the base plate; and
    a plurality of fixture blocks each comprising: a body positioned in a respective one of said pockets and removably attached to the base plate; and a work piece holder attached to the body, wherein the work piece holder holds a separate work piece for machining operations on the work piece by a machine tool external to the work piece holder system, said separate work piece being held individually by the work piece holder without cooperation of any other portions of the work piece holder system; wherein:
    the work pieces, or respective upper portions thereof, are held by the work piece holders at or above the top surface of the base plate, said work pieces being held at an orientation extending axially outwards from the top surface of the base and at a position radially spaced outwards from an outer edge of the base plate top surface; and
    the work piece holders are generally evenly angularly positioned about the periphery of the base plate top surface, with respect to the base plate longitudinal axis, for rotational indexing of the base plate about the longitudinal axis by an angular index corresponding to an angular distance between successive work piece holders.

2. The system of claim 1 wherein a diameter of the base plate is at least twice a height of the base plate.

3. The system of claim 2 wherein:
    each pocket is generally U-shaped and comprises: a generally U-shaped rear wall perpendicular to the base plate top surface, said rear wall being recessed into the base plate side wall in a radial direction towards the base plate longitudinal axis; and a generally U-shaped pocket side wall perpendicular to the rear wall and contiguous therewith, said rear wall and said pocket side wall together defining an open top of the pocket contiguous with the base plate top surface, and said pocket side wall having first and second parallel, spaced-apart legs extending down from the base plate top surface and a center section interconnecting the legs, said center section lying parallel to the top and bottom surfaces of the base plate; and
    the pockets are substantially identical to one another and are generally evenly distributed about the periphery of the side wall such that the base plate is generally radially symmetric with respect to the longitudinal axis.

4. The system of claim 3 wherein, for each fixture block:
    the fixture block base corresponds in shape to the shape of the pockets, said fixture block base having a top side parallel to the top surface of the base plate; and
    the work piece holder is integral with the fixture block base, said work piece holder having: first and second opposed clamp portions defining a slot there between, wherein the work piece is positioned in the slot; a plurality of fastener apertures formed in the work piece holder; and a plurality of fasteners respectively tightened down in the fastener apertures to draw the first and second opposed clamp portions towards one another to thereby clamp the work piece in the slot between the clamp portions.

5. A system for holding a plurality of work pieces, said system comprising:
    a base having a top surface, a bottom surface, and a peripheral side wall interconnecting the top and bottom surfaces, wherein the side wall comprises a plurality of pockets; and
    a plurality of fixture blocks respectively positioned in the pockets and removably attached to the base, wherein the fixture blocks hold work pieces or upper portions thereof at or above the top surface of the base, and wherein each fixture block holds a separate work piece for machining operations on the work piece by a machine tool external to the work piece holder system, said separate work piece being held individually by the fixture block without cooperation of any other portions of the work piece holder system.

6. The system of claim 5 wherein:
the base is generally cylindrical, said top and bottom surfaces of the base being generally flat and parallel to one another, and the side wall is generally polygonal and comprises a plurality of sides, with the plurality of pockets being respectively formed into the plurality of sides of the side wall;
a diameter of the base is at least twice a height of the base;
each pocket is generally U-shaped and has an open front, an open top contiguous with the base top surface, and a rear wall perpendicular to the base top surface; and
the fixture blocks each comprise:
  a fixture block base dimensioned to fit in the pockets; and
  a work piece holder integral with the fixture block base for holding a separate work piece at an orientation extending axially outwards from the top surface of the base.

7. The system of claim 6 wherein the base side wall has at least eight sides, and wherein there are at least eight pockets, one formed into each of said base side walls.

8. A system for holding a plurality of workpieces, said system comprising:
plurality holder means each for holding a workpiece; and
base means for supporting the plurality holder means.

9. A device for holding parts comprising:
a generally cylindrical base plate having a generally flat, generally circular top surface, a generally flat, generally circular bottom surface, and a peripheral side wall connecting the top and bottom surfaces, said base plate having a plurality of pockets in the side wall, wherein the pockets are evenly spaced around the side wall; and
a plurality of fixture blocks removably attached to the base plate side wall, each fixture block comprising:
  a fixture block base positioned in a respective one of said pockets; and
  a part holder attached to the fixture block base, said part holder holding at least a portion of a part at or above the base plate top surface for machining operations on the part by a machine tool external to the part holder device.

10. The device of claim 9 wherein:
the parts held by the fixture blocks are generally evenly angularly positioned about the periphery of the base plate top surface, with respect to a base plate longitudinal axis, for rotational indexing of the base plate about the longitudinal axis by an angular index corresponding to an angular distance between successive work piece holders; and
for each fixture block, the part holder holds a separate part, said part being individually held by the part holder without cooperation of any other portions of the part holder device, and said part being held by the part holder at an orientation extending axially outwards from the top surface of the base plate and at a location radially outwardly offset from an edge of the base plate top surface.

* * * * *